United States Patent
Weaver (10) Patent No.: US 9,448,132 B2
(45) Date of Patent: Sep. 20, 2016

(54) SYSTEM AND METHOD FOR MONITORING SEALS BETWEEN A STATIONARY CONDUIT AND A ROTATING CONDUIT

(71) Applicant: National Oilwell Varco, L. P., Houston, TX (US)

(72) Inventor: Randall Ferrain Weaver, McAlester, OK (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 632 days.

(21) Appl. No.: 13/891,916

(22) Filed: May 10, 2013

(65) Prior Publication Data
US 2013/0299238 A1 Nov. 14, 2013

Related U.S. Application Data

(60) Provisional application No. 61/645,915, filed on May 11, 2012.

(51) Int. Cl.
| G01M 3/02 | (2006.01) |
| E21B 47/10 | (2012.01) |
| E21B 21/02 | (2006.01) |
| G01M 3/28 | (2006.01) |
| G01M 13/00 | (2006.01) |

(52) U.S. Cl.
CPC ............... *G01M 3/02* (2013.01); *E21B 21/02* (2013.01); *E21B 47/10* (2013.01); *G01M 3/2853* (2013.01); *G01M 13/005* (2013.01)

(58) Field of Classification Search
CPC ........ E21B 21/02; E21B 47/10; G01M 3/02; G01M 13/005; G01M 3/2853
See application file for complete search history.

(56) References Cited

U.S. PATENT DOCUMENTS

| 5,170,659 A * | 12/1992 | Kemp | F16L 23/167 137/312 |
| 7,789,161 B2 * | 9/2010 | Riley | E21B 21/02 166/379 |
| 2003/0015840 A1 | 1/2003 | Davis | |
| 2004/0207159 A1 | 10/2004 | Morrow et al. | |
| 2007/0251703 A1 | 11/2007 | Riley et al. | |
| 2009/0152006 A1 | 6/2009 | Leduc et al. | |

FOREIGN PATENT DOCUMENTS

| GB | 2273167 A | 6/1994 |
| WO | 97/15814 A1 | 5/1997 |

OTHER PUBLICATIONS

PCT/US2013/040587 International Search Report and Written Opinion dated Jul. 22, 2014 (12 p.).

* cited by examiner

*Primary Examiner* — Nicole Coy
(74) *Attorney, Agent, or Firm* — Conley Rose, P.C.

(57) ABSTRACT

A device for monitoring a seal assembly includes a body having a central axis and a through-passage, a piston slidably disposed in the through-passage and biased towards one end of the body by a biasing member, and a signaling assembly coupled to the body. The signaling assembly includes an indicator and a switch coupled to the indicator. The through-passage and the piston are exposed to a fluid pressure in the seal assembly. The piston is configured to translate axially in the through-passage to transition the switch between a first position and a second position, allowing the switch to transition the indicator between a deactivated state and an activated state.

23 Claims, 8 Drawing Sheets

SYSTEM AND METHOD FOR MONITORING SEALS BETWEEN A STATIONARY CONDUIT AND A ROTATING CONDUIT

CROSS-REFERENCE TO RELATED APPLICATIONS

This application claims benefit of U.S. provisional patent application Ser. No. 61/645,915 filed May 11, 2012, and entitled "System and Method for Monitoring Seals Between a Stationary Conduit and a Rotating Conduit," which is hereby incorporated herein by reference in its entirety.

STATEMENT REGARDING FEDERALLY SPONSORED RESEARCH OR DEVELOPMENT

Not applicable.

BACKGROUND

The present invention relates generally to systems and methods for maintaining rotating equipment. More particularly, the invention relates to systems and methods for monitoring annular seals between a coupled fluid conduits that rotate relative to each other to identify seal failures.

In applications requiring the transmission of fluid under relatively high pressure, it is sometimes necessary to interconnect a rotating conduit with a stationary conduit, and to provide annular seals therebetween to prevent leakage of the pressurized fluid. One such application is in drilling operations where a wash pipe assembly includes a plurality of axially spaced annular seals radially disposed between a first conduit that rotates relative to a second conduit while pressurized drilling fluid flows through the first and second conduits. Initially, a first seal holds the pressure of the abrasive drilling fluid passing through the assembly. When the first seal eventually wears down and fails, fluid pressure is held by the next seal downstream of the first seal, and so on as drilling operations continue uninterrupted. However, when the final seal fails, drilling fluid may undesirably leak from the assembly, potentially spraying surrounding equipment and personnel. Thus, upon failure of the final seal, drilling operations are typically halted and each of the seals is replaced.

Seals in common use today typically last a few hundred hours, predicting the failure of the final seal is very difficult if not impossible. Unscheduled repairs are more costly than routine maintenance because productive work must cease for an additional period of time. Drilling costs may be thousands of dollars per hour. For a wash pipe seal failure, the nuisance of the fluid spray adds to the work required and to the cost.

BRIEF SUMMARY OF THE DISCLOSURE

These and other needs in the art are addressed in one embodiment by a device for monitoring a seal assembly, for example, a seal assembly disposed in an annular space between a first fluid conduit and a housing rotatably disposed about the first fluid conduit. The device includes a body having a central axis, a first end, a second end opposite the first end, and a through-passage extending axially from the first end to the second end and a piston slidably disposed in the through-passage of the body. The device also includes a biasing member axially disposed between the body and the piston, and the biasing member is configured to bias the piston axially towards the first end of the body. The device further includes a signaling assembly coupled to the second end of the body and including an indicator and a switch coupled to the indicator, wherein the indicator has an activated state and a deactivated state, and wherein the switch has a first position placing the indicator in the deactivated state and a second position placing the indicator in the activated state. The piston is configured to translate axially in the through-passage to transition the switch between the first position and the second position and transition the indicator between the deactivated state and the activated state. The through-passage is exposed to a fluid pressure in the annular space between the first fluid conduit and the housing.

These and other needs in the art are addressed in another embodiment by a drilling system that includes a first conduit, a second conduit configured to rotate relative the first conduit, and a wash pipe having a central axis, a first end coupled to the first conduit, and a second end coupled to the second conduit with a gland assembly. The gland assembly includes an annular housing disposed about the wash pipe, a first packing ring radially positioned between the wash pipe and the housing, a second packing ring radially positioned between the wash pipe and the housing and axially spaced from the first packing ring, and a fluid cavity radially positioned between the wash pipe and the housing and axially positioned between the first packing ring and the second packing ring. The drilling system also includes a self-contained seal monitoring device coupled to the housing and exposed to the fluid pressure in the fluid cavity. The seal monitoring device is configured to provide an indication in response to a predetermined fluid pressure in the fluid cavity.

These and other needs in the art are addressed in another embodiment by a method for identifying failure of a seal disposed between a first fluid conduit and a housing rotatably disposed about the first fluid conduit. In an embodiment, the method includes coupling a self-contained seal monitoring device to the housing; providing communication for pressure transfer between the seal monitoring device and a fluid cavity positioned between the housing and the first fluid conduit; and providing an indication with the seal monitoring device at a predetermined fluid pressure within the fluid cavity.

Embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the disclosed embodiments of the invention, reference will now be made to the accompanying drawings in which.

DETAILED DESCRIPTION OF THE DISCLOSED EMBODIMENTS

The following description is exemplary of embodiments of the invention. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, one or more components or aspects of a component may be not displayed or may not have reference numerals identifying the features or components that are identified elsewhere in order to improve clarity and conciseness of the figure.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. In addition, if the connection transfers electrical power or signals, whether analog or digital, the coupling may comprise wires or a mode of wireless electromagnetic transmission, for example, radio frequency, microwave, optical, or another mode. So too, the coupling may comprise a magnetic coupling or any other mode of transfer known in the art, or the coupling may comprise a combination of any of these modes. In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis. Any reference to up or down in the description and the claims will be made for purpose of clarification, with "up", "upper", "upwardly", or "upstream" meaning toward the surface of the well and with "down", "lower", "downwardly", or "downstream" meaning toward the terminal end of the well, regardless of the well bore orientation. In some applications of the technology, the orientations of the components with respect to the surroundings may be different. For example, components described as facing "up", in another implementation, may face to the left, may face down, or may face in another direction.

Any reference to a relative direction or relative position with respect to an object, for example "top," "bottom," "up," "upward," "left," "leftward," "down," "lower," and "clockwise," is made for purpose of clarification and pertains to the orientation as shown. If the object were viewed from another orientation, it may be appropriate to described direction or position using an alternate term.

Disclosed is an apparatus and system for monitoring seals and fluid pressure between a first conduit and a second conduit rotatably mounted to the first conduit. One particular application for the apparatus disclosed herein is as a wash pipe assembly used in the drilling of oil and gas wells. In such application, a conventional gooseneck includes a stationary conduit that extends toward and is aligned with a second stationary conduit forming a part of a rotatable swivel assembly, the other end of which is coupled a third conduit configured for rotation. This third conduit couples to, for example, a kelly or a drill pipe. During operation, pressurized drilling fluid, i.e. mud, is conveyed through the gooseneck and stationary conduit and into the rotating conduit. The assembly disclosed herein interconnects the aligned conduits and allows drilling fluid to be conducted therethrough by maintaining a dynamic seal as one conduit rotates relative to the fixed conduits. The rotatable swivel assembly comprises a series of axially-spaced, sequentially-activated annular seals and a self-contained seal monitoring device and pressure indicator activated by an increase in fluid pressure. Activation of the pressure indicator occurs when the final annular seal of the series receives fluid pressure, which occurs temporally near the point of failure of the sealing capability of the rotatable swivel assembly.

Figure 1:
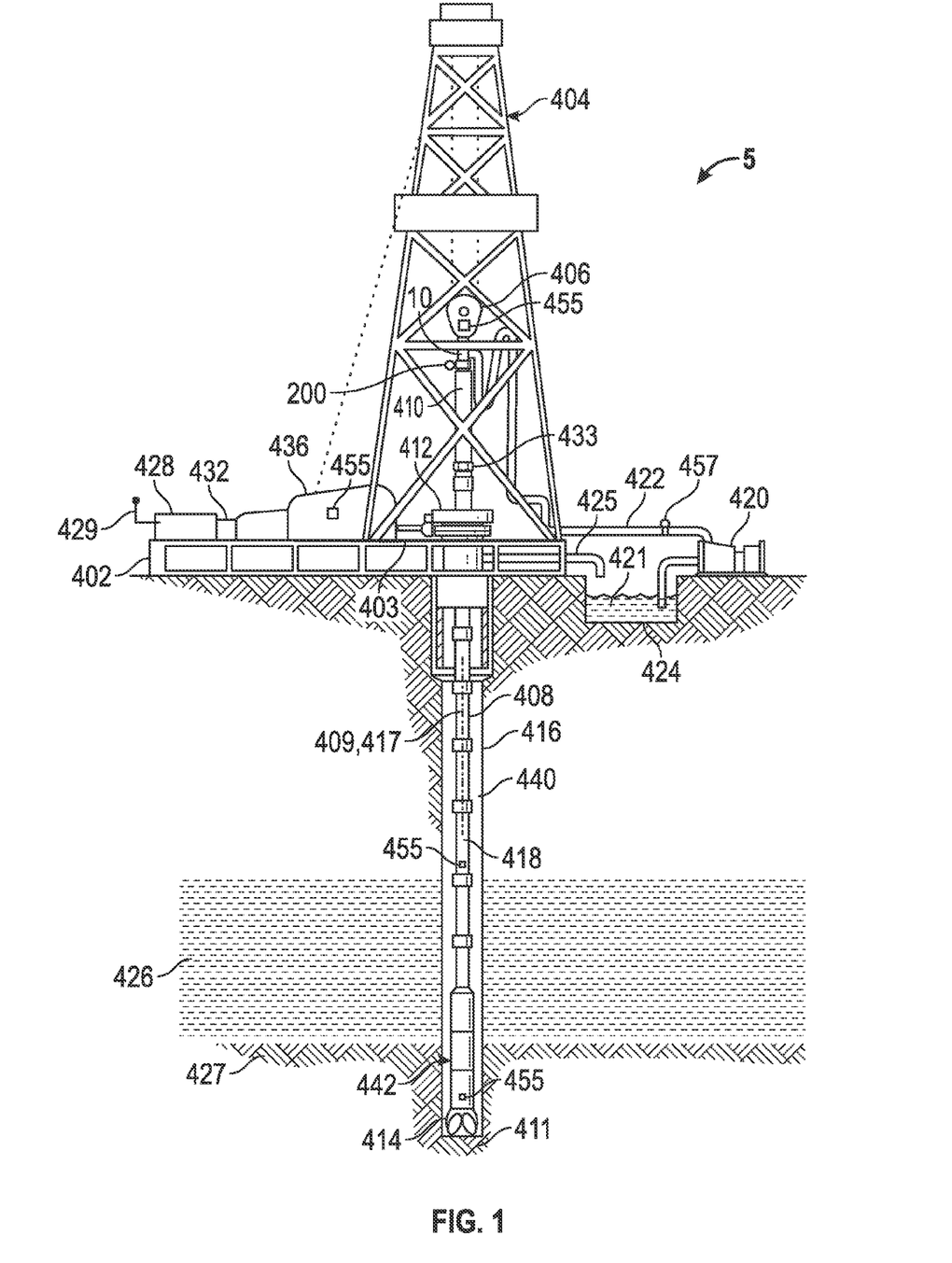
FIG. 1 is an elevation view in partial cross-section showing a system for drilling a borehole in accordance with principles disclosed herein.

Referring now to FIG. 1, an embodiment of a drilling system 5 in accordance with the principles described herein is schematically shown. Drilling system 5 includes a derrick 404 supported by a drilling platform 402. Derrick 404 includes a traveling block 406 for raising and lowering a drill string 408. The platform 402 includes a drilling floor 403 and supports a rotary table 412 selectively rotated by a prime mover such as an electric motor. A kelly 410 supports the drill string 408 as it is lowered through the rotary table 412.

Drill string 408 has a longitudinal axis 409 and includes a plurality of drill pipe joints 418 coupled together end-to-end, a bottom hole assembly (BHA) 442 coupled to the lower end of joints 418, and a drill bit 414 coupled to BHA 442. During drilling operations, the drill bit 414 is rotated with weight-on-bit applied to drill a borehole 416 having a central axis 417 and traversing multiple subsurface formations or zones 426, 427. The weight-on-bit, which impacts the rate of penetration of the bit 414 through the formation 426, 427, is controlled by a drawworks 436 including a motor and a motor controller. Although the drill string 408 and the drill bit 414 are rotated from the surface with rotary table 412 in this embodiment, in other embodiments, the drill string (e.g., drill string 408) and the drill bit (e.g., bit 414) are rotated with a top drive and/or a downhole mud motor.

Referring still to FIG. 1, the borehole 408 penetrates a subsurface formation, zone, or reservoir, such as reservoir 411 in subsurface formation 427. During drilling operations a suitable drilling fluid 421, also referred to as mud or drilling mud, in a mud tank 424 is circulated under pressure through the drill string 408 by a mud pump 420. In particular, the mud 421 is pumped by mud pump 420 through a fluid line 422, a wash pipe assembly 10, and the kelly 410 down drill string 408. The mud 421 is discharged at the borehole bottom through nozzles in the drill bit 414. The mud 421 circulates to the surface through the annulus 440 between the drill string 408 and the sidewall of borehole 416, and returns to the mud tank 424 via a solids control system (not shown) and a return line 425. The mud 421 transports cuttings from the borehole 416 and cools the bit 414. The solids control system substantially separates the cuttings from the mud 421 at the surface, and can include hardware such as shale shakers, centrifuges, and automated chemical additive systems.

Drilling control system 428 communicates with and receives outputs from various sensors 455, and communicates with and sends commands to various actuators (not shown) via coupling connection 432 that may be wired or wireless. Connection 432 includes a top-hole repeater unit 433 disposed adjacent kelly 410. Drilling control system 428 also evaluates and controls drilling performance and borehole conditions. Sensors 455 monitor pressure, temperature, rotational speed, motor torque, weight-on-bit, and other parameters for drilling system 5. A fluid sensor 457 disposed in the fluid line 422 measures and provides information about the drilling fluid flow rate and pressure.

Drilling control system 428 is coupled to external computer or communication networks, including the internet (e.g. the world-wide-web) via a wired or wireless coupling, for example antenna 429 in this embodiment. The connection can be Ethernet compatible, may use cellular telephonic technology, or may use any other communications technology known in the art.

Figure 2:
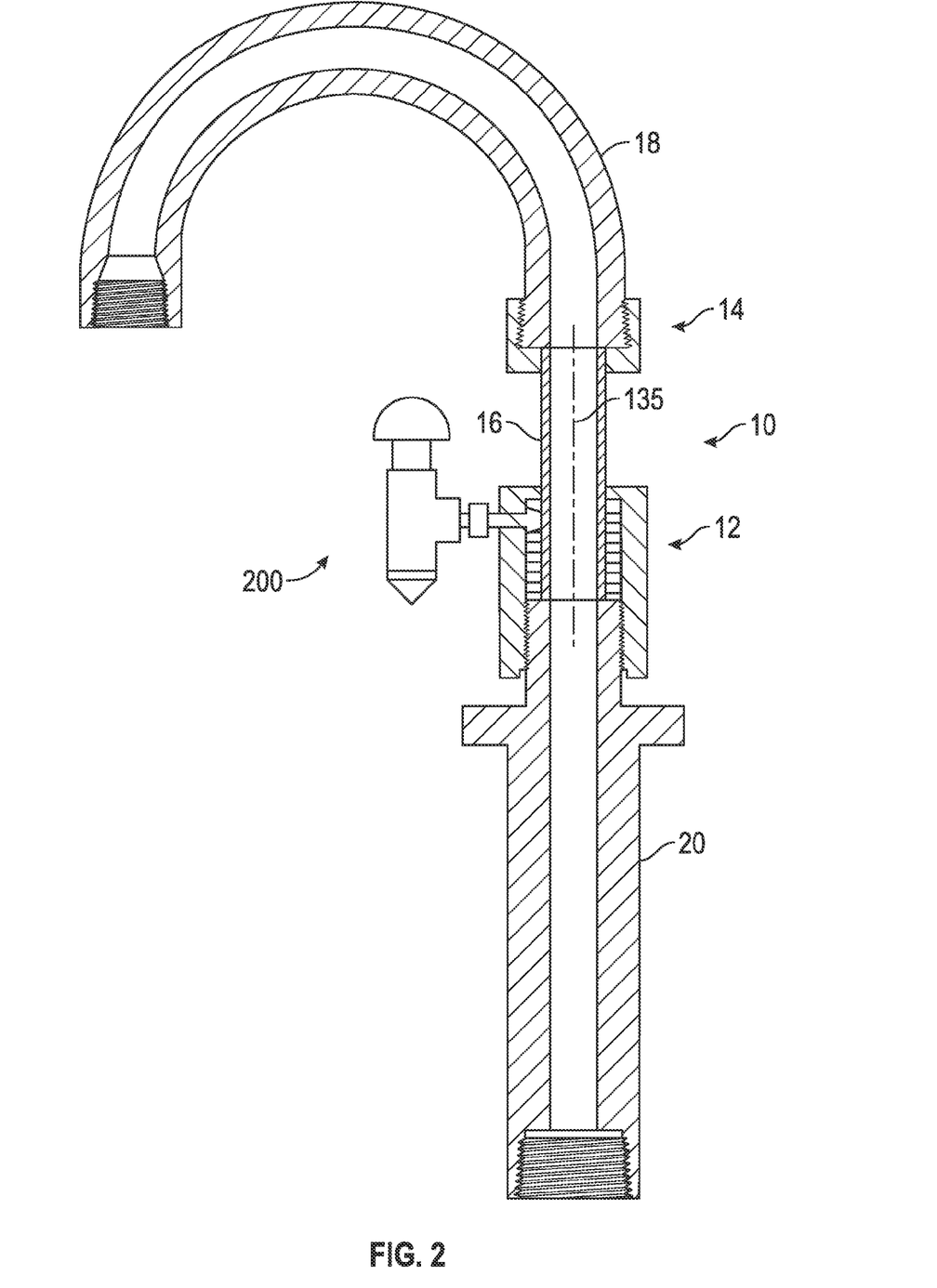
FIG. 2 is a partial schematic cross-sectional view of the wash pipe assembly of FIG. 1.

Referring now to FIG. 2, the wash pipe assembly 10 is schematically shown. The assembly 10 has a central axis 135 and is positioned between a first conduit 18 and a second conduit 20. In general, the wash pipe assembly 10 allows the second conduit 20 to rotate relative to the first conduit 18 while drilling mud 421 flows from the first conduit 18 to the second conduit 20. Thus, the wash pipe assembly 10 places the conduits 18, 20 in fluid communication while allowing relative rotation therebetween. Conduit 18 may also be referred to as a "gooseneck" because conduit 18 includes an arc that is in this example a 180 degree arc.

The wash pipe assembly 10 includes a fluid conduit or wash pipe 16 having ends coupled to conduits 18, 20, a lower gland assembly 12 extending between wash pipe 16 and conduit 20, an upper gland assembly 14 extending between wash pipe 16 and conduit 18, and a self-contained seal monitoring and pressure indicator assembly 200 coupled to lower gland assembly 12. Wash pipe 16 is coaxially within assembly 10, and thus, shares central axis 135 with assembly 10. The upper gland assembly 14 coaxially aligns and couples the upper end of wash pipe 16 to one end of the first conduit 18. The lower gland assembly 12 coaxially aligns and couples the lower end of wash pipe 16 to the upper end of rotating conduit 20. In this embodiment, the lower gland assembly 12 threadingly connects to rotating conduit 20, and the lower gland assembly is rotatably disposed about the lower end of the wash pipe 16. As will be described in more detail below, the upper gland assembly 14 seals between the upper end of wash pipe 16 to one end of the first conduit 18 and the lower gland assembly 12 seals between the lower end of wash pipe 16 to the upper end of rotating conduit 20. Accordingly, the gland assemblies 12, 14 may also be referred to as seal assemblies.

Figure 3:
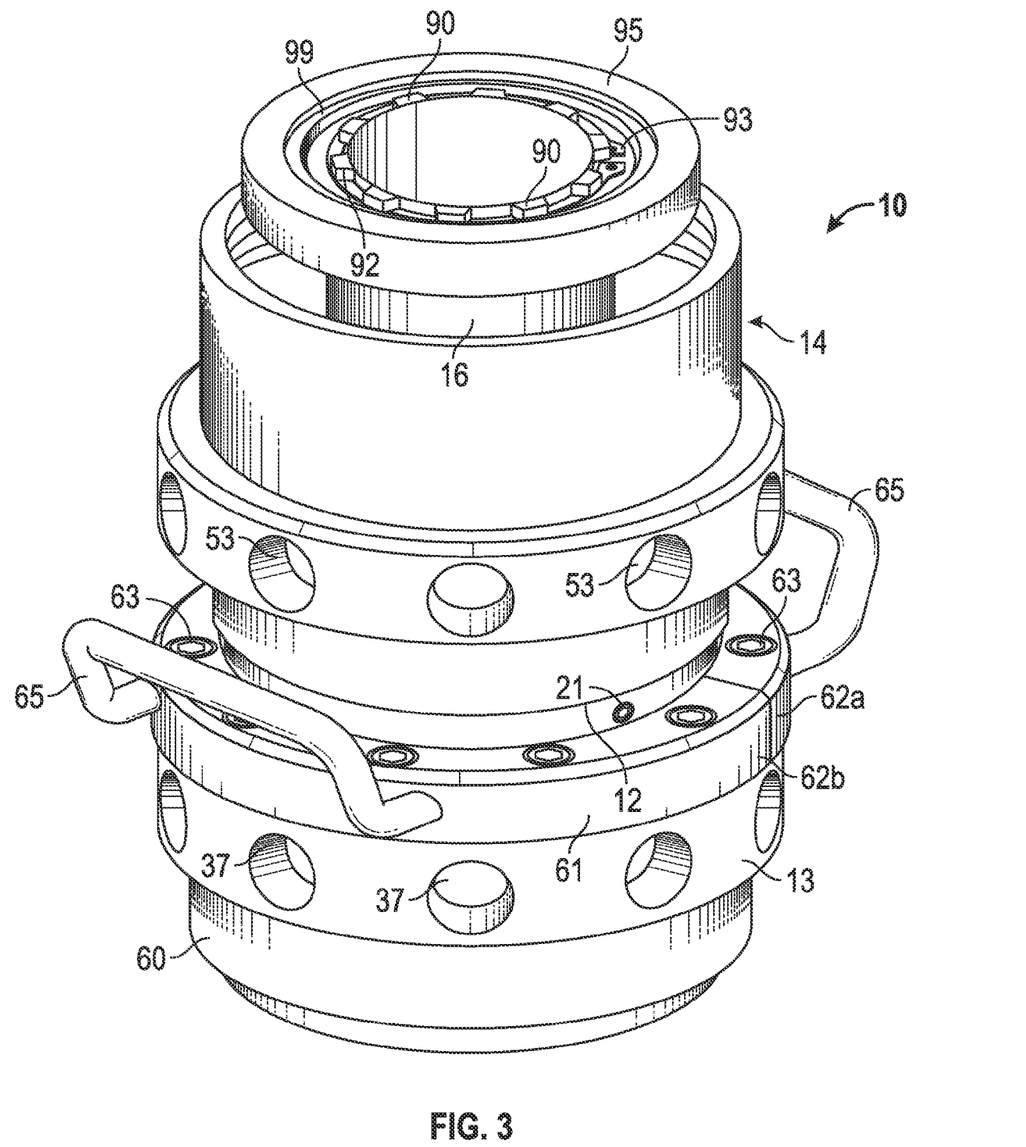
FIG. 3 is a perspective view of the wash pipe assembly of FIG. 2.
Figure 4:
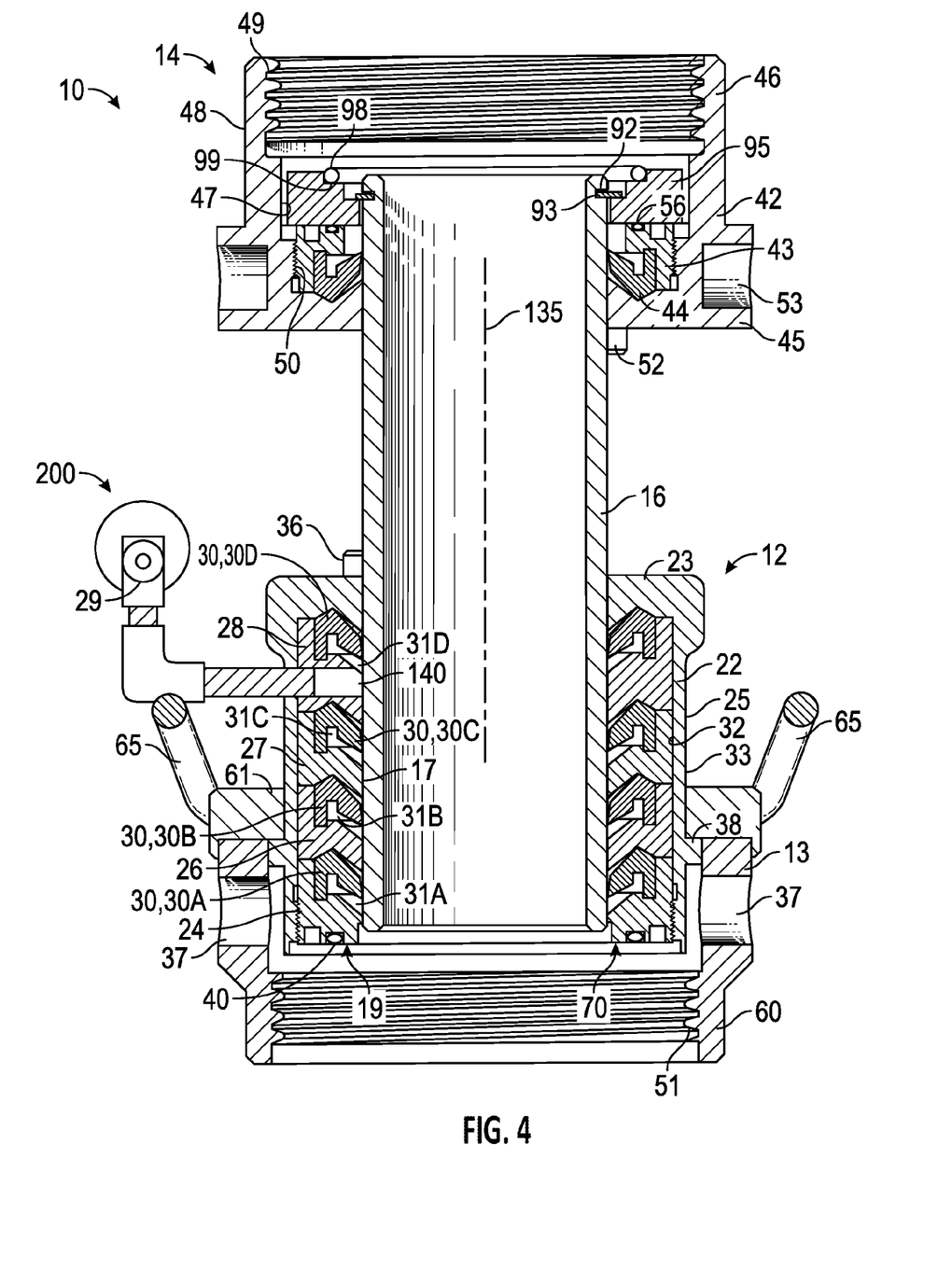
FIG. 4 is an enlarged partial cross-sectional view of the wash pipe assembly of FIG. 2.

Referring now to FIGS. 3 and 4, a lower gland nut 13 is disposed about lower gland assembly 12 and includes an internally threaded region 51 that threadably engages mating external threads provided at the upper end of rotating conduit 20 previously described. As nut 13 is tightened onto conduit 20, the lower gland assembly 12 is compressed into engagement with the upper end of conduit 20. In this embodiment, the lower gland nut 13 is a two-piece component including a sleeve portion 60 and a collar portion 61 coupled to the upper end of the sleeve portion 60. Collar portion 61 includes two semicircular collar segments 62a, 62b that are secured to sleeve portion 60 by fastener 63 as shown in FIG. 3. Each semi-circular collar segment 62a, 62b has a handle 65 that facilitates the axial movement of the lower gland assembly 12 and gland nut 13 relative to wash pipe 16 during connection of the wash pipe assembly 10 to conduit 20. In addition, the sleeve portion 60 of the lower gland nut 13 includes a plurality of circumferentially-spaced tool-engaging recesses 37 that facilitate rotation of the gland nut 14 to thread and unthread the nut 14 onto the upper end of conduit 20.

Figure 5:
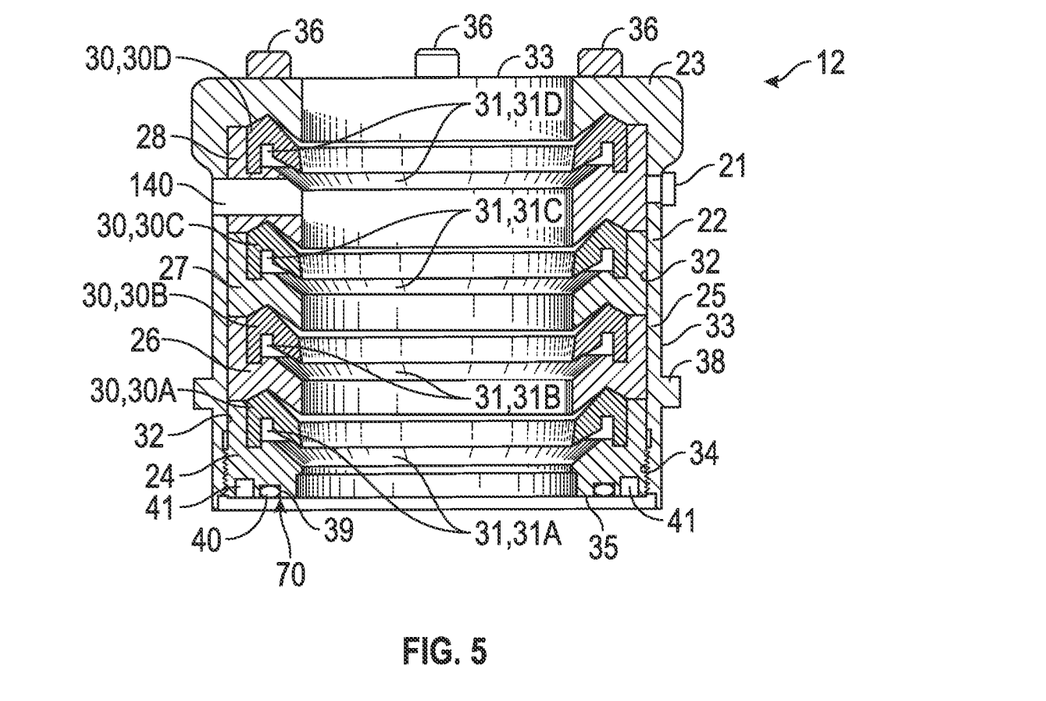
FIG. 5 is an enlarged cross-sectional view of the lower seal gland housing of FIG. 4.

Referring now to FIGS. 4 and 5, in this embodiment, the lower gland assembly 12 includes a lower gland housing 22, a threaded set-ring 24, a pair of intermediate spacer rings 26, 27, an upper spacer ring 28, and a plurality of annular resilient seals or packing rings 30. Lower gland housing 22 includes a base or flange portion 23 and a cylindrical sleeve portion 25 extending axially therefrom. Sleeve portion 25 has a generally cylindrical inner surface 32 and a generally cylindrical outer surface 33. An annular flange 38 extends radially outward from outer surface 33. Four uniformly circumferentially-spaced lugs 36 extend axially from the base portion 23.

Rings 24, 26, 27, 28, 30 are arranged in an axial stack within housing 22. More specifically, moving axially downward through housing 22, the stack includes a first packing ring 30, the upper spacer ring 28, a second packing ring 30, one intermediate spacer ring 27, a third packing ring 30, the second intermediate spacer ring 26, a fourth packing ring 30, and the set-ring 24. Thus, one packing ring 30 is disposed at the top of the stack, the set-ring 24 is disposed at the bottom of the stack, and one spacer ring 26, 27, 28 is positioned between each pair of axially adjacent packing rings 30. Thus, in this embodiment, four annular resilient packing rings 30 are provided within housing 22. For purposes of clarity and further explanation, the four packing rings 30 are also designated with reference numerals 30A, 30B, 30C, 30D. In other embodiments, more or less than four packing rings (e.g., rings 30) can be provided in the lower gland assembly (e.g., the lower gland assembly 12).

Set-ring 24 is threaded into housing 22, thereby axially compressing and maintaining the stacked arrangement of rings 24, 26, 27, 28, 30 within housing 22. In particular, the inner surface 32 of the lower housing 22 includes an internal threaded portion 34 that engages mating threads formed on the radially-outer surface of threaded bottom packing ring 24. Set-ring 24 has a lower end face 35 with an annular groove or gland 39 and a plurality of circumferentially-spaced tool-engaging bores 41. An annular O-ring seal 40 seated within gland 39 forms an annular seal with the upper end of conduit 20 when the lower gland assembly 12 is coupled thereto.

An annular fluid zone or cavity 31 is axially positioned between each ring 24, 26, 27, 28 and the axially adjacent packing ring 30A, 30B, 30C, 30D, respectively. Thus, four annular fluid zones or fluid cavities 31 are provided within housing 22 about wash pipe 16 (FIG. 4). For purposes of clarity and further explanation, the fluid cavities 31 are also designated with reference numerals 31A, 31B, 31C, 31D— annular fluid cavity 31A is axially disposed between threaded set-ring 24 and the first annular resilient packing ring 30A, annular fluid cavity 31B is axially disposed between spacer ring 26 and packing ring 30B, annular fluid cavity 31C is axially disposed between spacer ring 27 and packing ring 30C, and annular fluid cavity 31D is axially disposed between spacer ring 28 and packing ring 30D.

Referring still to FIGS. 4 and 5, a passage 140 extends radially through sleeve portion 25 of the housing 22 and upper packing ring 28. Passage 140 is in fluid communication with annular fluid cavity 31D immediately below uppermost packing ring 30D. Seal monitoring and pressure indicator assembly 200 is coupled to housing 22 and placed in fluid communication with passage 140 and fluid cavity 31D. Thus, fluid and fluid pressure are freely transmitted between fluid cavity 31D and assembly 200. In this embodiment, assembly 200 is threaded into passage 140. A stop 21 is provided on the outside of housing 22 to prevent impingement and possible damage to assembly 200 when lower gland nut 13 is axially raised relative to housing 22.

As best shown in FIG. 4, when wash pipe assembly 10 is assembled, housing 22 is rotatably disposed about wash pipe 16, and rings 24, 26, 27, 28, 30 are disposed in an annular cavity or space 19 radially positioned between the wash pipe 16 and the housing 22. Rings 24, 26, 27, 28 form static annular seals with housing 22 and rings 30, and rings 30 slidingly engage and form annular dynamic seals with the wash pipe 16. In addition, seal 40 forms an annular static seal with ring 24 and an annular static seal with the upper end of the conduit 20. Accordingly, rings 24, 26, 27, 28, 30 and seal 40 may generally be described as a seal assembly 70 of the lower gland assembly 12.

Referring still to FIG. 4, the rings 24, 26, 27, 28, 30 are sequentially wetted, based on their axial position, as wash pipe assembly 10 ages with use. In particular, during drilling operations, pressurized drilling mud flows from the conduit 20 into wash pipe 16. Resilient packing ring 30A is most proximal the threaded region 51 and the lower end of wash pipe 16, and thus, the packing ring 30A is the first ring 30 exposed to and energized by pressurized drilling mud flowing from the conduit 20 into the wash pipe 16. With packing ring 30A energized and forming a dynamic seal with wash pipe 16 and a static seal with the ring 24, the remaining seals 30B, 30C, 30D are isolated from the pressurized drilling fluid. However, upon failure of packing ring 30A, the packing ring 30B is then exposed to and energized by pressurized drilling mud flowing from the conduit 20 into the wash pipe 16. With packing ring 30B energized and forming a dynamic seal with wash pipe 16 and a static seal with the ring 26, the remaining seals 30C, 30D are isolated from the pressurized drilling fluid. However, upon failure of packing ring 30B, the packing ring 30C is then exposed to and energized by pressurized drilling mud flowing from the conduit 20 into the wash pipe 16. With packing ring 30C energized and forming a dynamic seal with wash pipe 16 and a static seal with the ring 27, the remaining seal 30D is isolated from the pressurized drilling fluid. However, upon failure of packing ring 30C, the packing ring 30D is then exposed to and energized by pressurized drilling mud flowing from the conduit 20 into the wash pipe 16. Thus, packing ring 30D is exposed to and energized by pressurized drilling fluid only after failure of packing rings 30A, 30B, 30C. In other words, resilient packing ring 30D provides a barrier to fluid loss after the other packing rings 30A, 30B, 30C have failed. Since assembly 200 is in fluid communication with annular fluid cavity 31D via passage 140, upon failure of packing rings 30A, 30B, 30C, assembly 200 is exposed to the fluid pressure of the drilling mud in wash pipe 16 and conduit 20.

Figure 6:
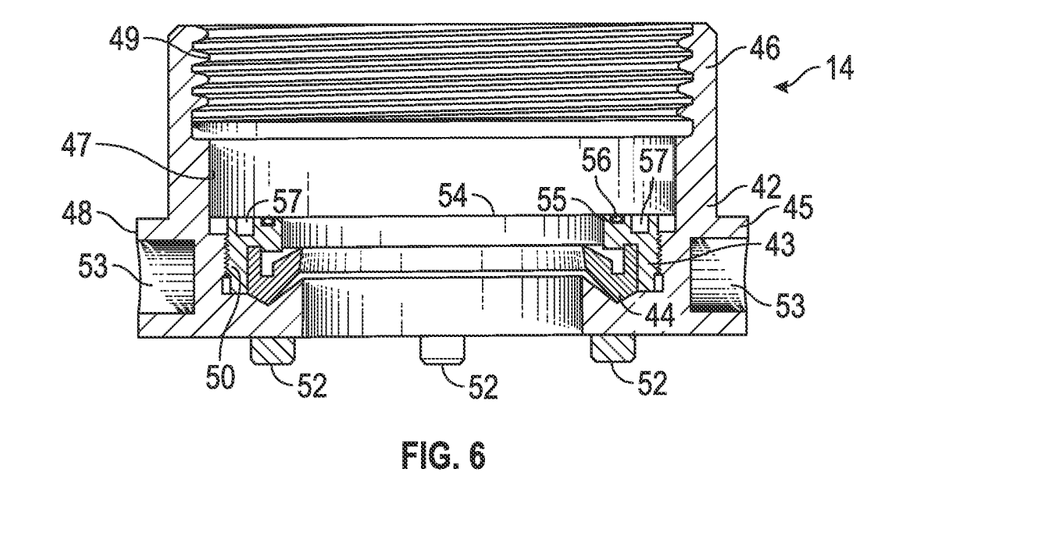
FIG. 6 is enlarged cross-sectional view of the upper seal gland housing of FIG. 4.

Referring now to FIGS. 4 and 6, the upper gland assembly 14 includes an upper gland housing 42, a threaded upper set-ring 43 disposed within housing 42, and annular resilient packing ring 44 disposed within housing 42 axially adjacent set-ring 43. Upper gland housing 42 includes a base or flange portion 45 and a cylindrical portion 46 extending axially therefrom. The upper gland housing 42 includes inner and outer generally cylindrical surfaces 47, 48, respectively. Inner surface 47 includes an internally threaded region 49 along portion 46 that threadably engages mating external threads provided on the lower end of conduit 18 previously described, thereby coupling upper gland assembly 14 to conduit 18. The inner surface 47 further includes a second threaded segment 50 adjacent to the base 45 for threadably engaging mating external threads provided on upper set-ring 43. The outer surface 48 of base portion 45 includes four downwardly-extending lugs 52 and a plurality of circumferentially-spaced tool-engaging recesses 53 extending radially inward from outer surface 48.

Upon assembly, packing ring 44 is positioned axially adjacent the base portion 45 of the upper gland housing 42, and the upper set-ring 43 is threaded into housing 42. The upper end face 54 of the upper set-ring 43 includes an annular seal gland or groove 55 within which an O-ring seal 56 is disposed. Also included in upper end face 54 are a plurality of uniformly circumferentially spaced tool-engaging bores 57, which facilitate the engagement and rotation of the set-ring 43 during assembly of upper gland assembly 14.

Referring briefly to FIGS. 3 and 4, the upper end of wash pipe 16 includes a plurality of circumferentially-spaced milled lugs 90. During assembly of upper gland assembly 14, a lug collar 95 is disposed within upper gland housing 42 axially adjacent set-ring 43. The radially inner surface of lug collar 95 includes a plurality of circumferentially spaced lugs sized and positioned to slidingly engage the axially-extending slots between lugs 90 of wash pipe 16 and an annular groove 92 in its upper end face. Lug collar 95 is mounted to the upper end of wash pipe 16 via sliding engagement of lugs 90 and mating lugs of lug collar 95, and then a snap ring 93 is disposed within groove 92 about wash pipe 16 between lugs 90 and mating lugs of lug collar 95 to limit the axial movement of lug collar 95. An upper annular O-ring seal 98 is disposed in an annular seal groove 99 formed in the upper surface of lug collar 95. When upper gland assembly 14 is threaded onto the lower end of conduit 18, seal 56 is compressed against the opposed end face of lug collar 95, and seal 98 is compressed against the opposed end face of conduit 18.

Figure 7:
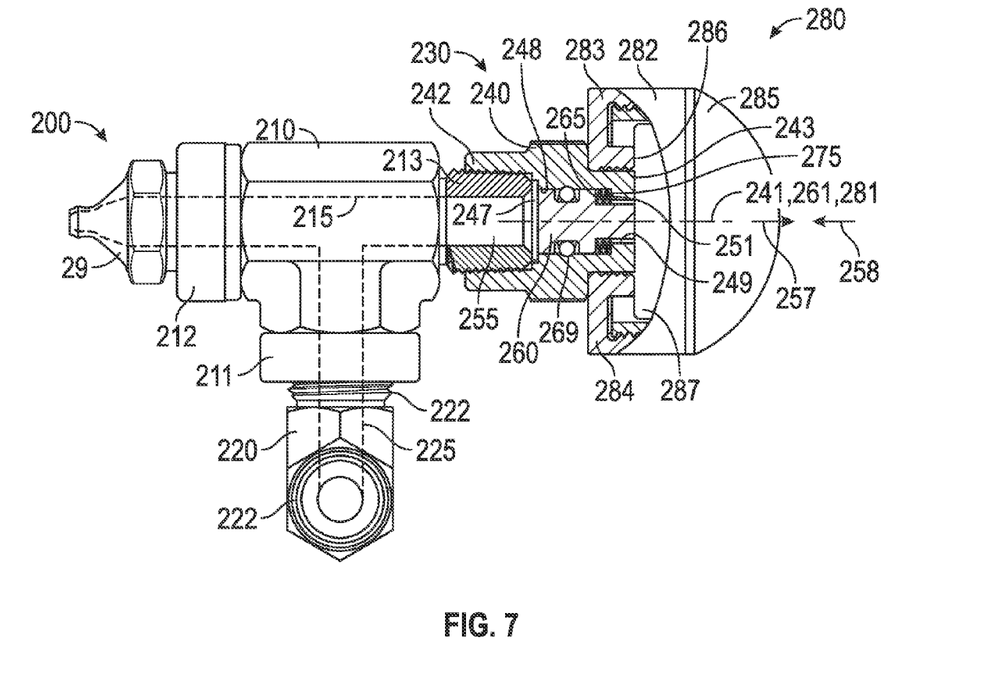
FIG. 7 is an enlarged partial cross-sectional side view of the self-contained seal monitoring and pressure indicator assembly of FIG. 2.

Referring now to FIGS. 4 and 7, seal monitoring and pressure indicator assembly 200 comprises a Tee fitting 210, a grease fitting 29, a ninety-degree elbow fitting 220, and a self-contained seal monitoring device 230. Tee fitting 210 comprises an internally threaded first end 211, an internally threaded second end 212, an externally threaded third end 213, and an internal flow passage 215 extending between each end 211, 212, 213. Elbow 220 comprises two externally threaded ends 222 and a central flow passage 225 extending between ends 222. In this embodiment, each set of threads provided in assembly 200 are tapered pipe threads that tighten as mating male and female threads engage, thereby allowing pressure to be held without a seat gasket or an O-ring. However, in some other embodiments, other types of threads, seals, gaskets, or combinations thereof are employed.

Grease fitting 29 is threaded into end 212 and allows one-way injection of grease into assembly 200. For example, as shown in FIG. 4, grease can be injected into lower gland assembly 12 via fitting 29 and passages 215, 225, 140 to lubricate between the wash pipe 16 and the surfaces of seals 30. In this embodiment, grease fitting 29 is a standard fitting including a check valve to allow grease to be injected into assembly 200 and lower gland assembly 12 but restrict grease from exiting assembly 200 and lower gland assembly 12 via fitting 29. Although assembly 200 is provided with grease fitting 29 in this embodiment, in other embodiments, the grease fitting (e.g., grease fitting 29) is not included with the seal monitoring assembly (e.g., assembly 200), but rather, coupled to the lower gland assembly (e.g., lower gland assembly 12) at another selected location so as to inject grease into the lower gland assembly 12 at that selected location.

Referring still to FIG. 7, self-contained seal monitoring device 230 is a battery-powered device that responds to a sufficient increase in fluid pressure within passage 140 (via intermediary passages 225, 215) indicative of the failure of packing rings 30A, 30B, 30C by emitting a detectable signal. In this embodiment, seal monitoring device 230 emits a visual signal for observation by operators of drilling system 5 independent of other equipment. Since device 230 is battery-powered and provides a visual indicator, power, data, and signal communication cables/wires are unnecessary, thereby enabling device 230 to be "self-contained," as well as eliminate the risk of such cables/wires interfering with nearby rotating equipment.

Figure 9:
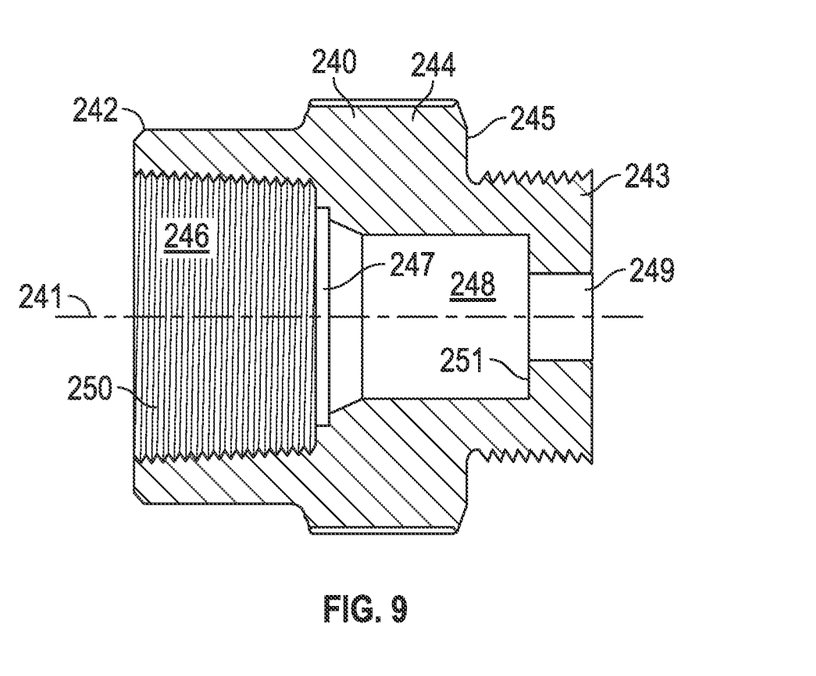
FIG. 9 is an enlarged cross-sectional view of the primary body of the self-contained seal monitoring and pressure indicator assembly of FIG. 7.

In this embodiment, device 230 comprises a generally cylindrical body 240, a piston 260 slidingly disposed in body 240, a resilient biasing member 275 positioned in body 240 adjacent piston 260, and an emitter or signaling assembly 280. As best shown in FIG. 9, body 240 has a central axis 241, an internally threaded first end 242, an externally threaded second end 243 opposite the first end 242, an intermediate portion 244 between ends 242, 243, and a through-passage 250 extending axially from the first end 242 to the second end 243. Through-passage 250 includes an internally threaded first passage segment 246 extending axially through first end 242, a second passage segment 247 extending axially from passage segment 246, a third passage segment 248 extending from second passage segment 247, and a fourth passage segment 249 extending from third passage segment 248 through the end 243. The first passage segment 246 has a first diameter, the second passage segment 247 has a second diameter that is less than the first diameter, the third passage segment 248 has a third diameter that is less than the second diameter, and the fourth passage segment 249 has a fourth diameter that is less than the third diameter. Thus, passages 246, 247, 248, 249 have progressively smaller diameters, and progressively smaller diameters result in the formation of multiple annular shoulders located at the intersections of axially adjacent passages 246, 247, 248, 249. For example, body 240 includes an inner annular shoulder 251 at the intersection of passage segments 248, 249. Thus, body 240 is a generally tubular structure including a plurality of interconnected, coaxially aligned, cylindrical bores or passage segments 246, 247, 248, 249 extending between ends 242, 243.

Central portion 244 has an outer diameter that is greater than the outer diameter of ends 242, 243, thereby resulting in annular shoulders on the outside of body 240 at the intersection of central portion 244 with each end 242, 243. In particular, an annular shoulder 245 is positioned along the radially outer surface of body 240 at the intersection of central portion 244 and end 243. In this embodiment, the outer surface of central portion 244 comprises a plurality of circumferentially adjacent flats that define a hexagonal surface for tool engagement.

Figure 10:
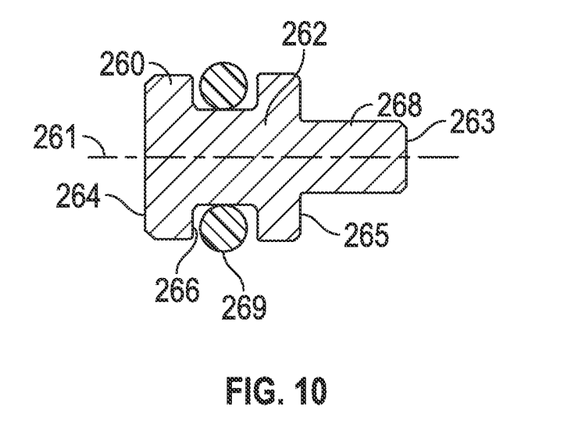
FIG. 10 is an enlarged cross-sectional view of the piston of the self-contained seal monitoring and pressure indicator assembly of FIG. 7.

Referring now to FIGS. 7 and 10, piston 260 has a central axis 261, a first cylindrical portion 262 extending axially from a first end 264, and a second cylindrical portion 268 extending axially from the opposite end 263 to first portion 262. The radially outer surface of first portion 262 includes an annular recess or groove 266 within which an annular seal 269 is seated. As shown in FIG. 7, seal 269 forms an annular static seal with portion 262 and an annular dynamic seal with body 240, thereby restricting and/or preventing fluid from flowing between piston 260 and body 240. In addition, first portion 262 has an outer diameter that is greater than the outer diameter of second portion 262, resulting in an annular shoulder 265 at the intersection of portions 262, 268.

Figure 8:
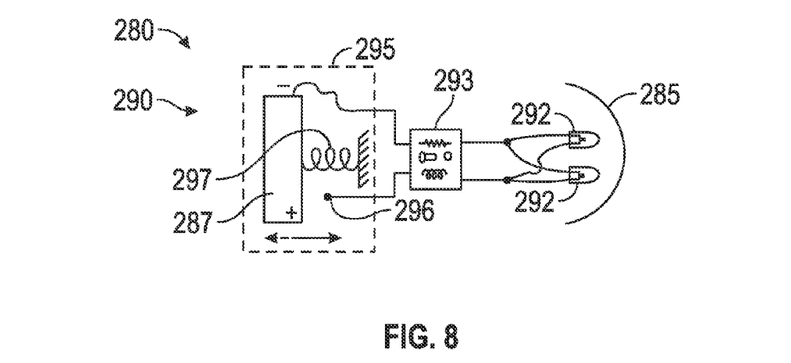
FIG. 8 is a schematic partial view of the electrical circuit of the self-contained seal monitoring and pressure indicator assembly of FIG. 7.

Referring now to FIGS. 7 and 8, signaling assembly 280 has a central axis 281 and includes a signal body 282, a lens 285 coupled to body 282, and an electrical circuit 290 disposed within body 282. Body 282 has a connection end 283 coupled to body 240, and lens 285 is mounted to body 282 opposite end 283. In this embodiment, connection end 283 includes an internally threaded port 284 that threadably receives externally threaded end 243 of body 240.

Electrical circuit 290 includes a battery 287, a plurality of indicators 292, a circuit board 293, and an electrical switch 295 electrically coupled to the lights 292 and the circuit board 293. In this embodiment, indicators 292 are lights and, more particularly, are light-emitting diodes (LEDs) that serve as visual indicators. Indicators 292 have an energized or activated state and a de-energized or deactivated state, for example, illuminated and not illuminated, respectively.

Indicators 292 are transitioned between the activated and deactivated states by switch 295. In particular, switch 295 has a first position placing indicator 292 in the deactivated state and a second position placing indicator 292 in the activated state. In this embodiment, switch 295 includes an electrical contact 296, a biasing member 297 (e.g., a spring), and a disc-shaped battery 287. Biasing member 297 biases battery 287 away from electrical contact 296 and into engagement with an internal annular shoulder 286 disposed about port 284. When battery 287 does not engage the electrical contact 296, indicators 292 are deactivated. However, when the biasing force generated by biasing member 297 is overcome by fluid pressure within passages 140, 215, 225 and battery 287 is moved axially away from shoulder 286 and into engagement with the electrical contact 296, indicators 292 are transitioned to the activated state. Thus, switch 295 may be described as having a first position with battery 287 spaced apart from contact 296 (indicators 292 in the deactivated state), and a second position with battery 287 engaging contact 296 (indicators 292 in the activated state).

Circuit board 293 is coupled to switch 295 and influences the state of indicator 292. For example, circuit board 293 can be configured such that indicators 292 remains steadily activated while switch 295 remains in its second position, or configured to alter the signal produced by indicator 292 while switch 295 remains in its second position (e.g., indicators 292 flash on and off while switch 295 remains in its second position). In some embodiments, circuit board 293 is eliminated.

Referring still to FIG. 7, when self-contained seal monitoring device 230 is assembled, through-passage 250 of primary body 240 slidingly receives piston 260 with first portion 262 disposed within third passage segment 248 and second portion 268 partially disposed within fourth passage segment 249. Second portion 268 is axially extendable through and beyond the fourth passage segment 249. Biasing member 275 is axially positioned between shoulders 251, 265 of body 240 and piston 260, respectively. In this embodiment, biasing member 275 is a resilient spring disposed about second portion 268. Seal 269 is disposed in groove 266 and slidingly engages body 240. In addition, end 243 of body 240 is threaded into port 284 until body 282 axially abuts shoulder 245. With biasing member 275 relaxed (i.e. not compressed), piston end 263 is generally flush with end 243 of body 240 and shoulder 286, and piston end 264 is positioned axially adjacent second passage segment 247 without extending into first passage segment 246; this is the resting position of piston 260. When piston moves closer to end 243 in a rightward direction 257 parallel to axis 241, biasing member 275 exerts a force to oppose such movement and to return piston 260 to the resting position shown in FIG. 7. In this manner, member 275 biases piston 260 axially towards the first end 242 of the body 240. For seal monitoring assembly 200, end 213 of Tee fitting 210 is threaded into end 242 of body 240, end 222 of elbow 229 is threaded into end 211 of Tee fitting 210, and grease fitting 29 is threaded into end 212. As shown in FIG. 7, third end 213 of Tee fitting 210 is sized such that it does not extend into second passage segment 247. In addition, the diameter of passage segment 215 in third end 213 is smaller than the outer diameter of first portion 262 of piston 260, thereby limiting the extent of leftward axial movement of piston 260 such that at least a portion of second portion 268 remains within fourth passage segment 249 of primary body 240.

FIG. 7 shows a chamber 255 extending axially from the first end 242 of body 240 to the piston 260. Chamber 255 includes a portion of through-passage 250, such as second passage segment 247, and chamber 255 overlaps a portion of passage segment 215 located in third end 213 of Tee fitting 210.

Referring to FIGS. 4 and 7, with assembly 200 coupled to lower gland assembly 12, passage segments 215, 225, 140, and chamber 255, are in fluid communication with annular fluid cavity 31D axially adjacent packing ring 30D. Therefore, at least a portion of the through-passage 250 is in fluid communication with the annular space 19 between wash pipe 16 and lower gland housing 22. At a minimum, chamber 255 is exposed to the fluid pressure of annular fluid cavity 31D, and therefore, through-passage 250 and piston 260 are exposed to the fluid pressure in passage 140 and cavity 31D. Moreover, piston 260 is configured to move or, more specifically, to translate axially within the through-passage 250 of the body 240 in response to a force differential developed by fluid pressure acting in one direction and the biasing force acting in the opposite direction along piston axis 261. The fluid pressure in the chamber 255 acts on the piston 260 in a rightward direction 257, and the biasing force acts on the piston axial in a leftward direction 258. The biasing force is provided by the combination of biasing member 275 and biasing member 297 as the fluid pressure in chamber 255 exerts a force against piston end 264. When the fluid pressure in chamber 255 is sufficient to overcome the piston's biasing force, piston 260 begins to translate axially in the rightward direction 257 and begins to push battery 287 axially away from shoulder 286. If the fluid pressure in fluid cavity 31D and in chamber 255 is sufficiently large, piston 260 pushes battery 287 into engagement with the electrical contact 296, thereby activating indicators 292. When the pressure in chamber 255 exerts a force less than the biasing force of biasing members 275, 297, piston 260 remains or returns to the position depicted in FIG. 7, and piston 260 transitions battery 287 out of engagement with the electrical contact 296, aided by biasing member 297. Therefore, piston 260 is configured to translate axially in the through-passage 250 in body 240 to transition the switch 295 between the switch's first position and second position and to transition the indicators 292 between the deactivated state and the activated state. In this manner, seal monitoring device 230 is configured to provide indication, i.e. activation of indicators 292, upon failure of the packing ring 30C.

Referring now to FIGS. 7 and 10, it should be appreciated that the diameter of piston first portion 262 and first end 264, the length and the spring constant of biasing member 275, and the length and the spring constant of the biasing member 297 can be selected such that battery 287 engages contact 296 and activates indicators 292 in response to a predetermined fluid pressure in fluid cavity 31D within annular space 19. Thus, seal monitoring device 230 is configured to be activated and provide an indication when fluid pressure exerts a force on piston end 264 that exceeds the biasing force of biasing members 275, 297.

The length of second cylindrical portion 268 on piston 260 relative to the length of fourth passage segment 249 can also be varied to determine or to set the predetermined fluid pressure for fluid cavity 31D that causes indicators 292 to transition between the activated and deactivated states. For example, in some embodiments, piston portion 268 is shorter than shown in FIG. 7, and piston end 263 is not flush with end 243 of body 240 in the piston's resting position. Generally, piston 260 is in its resting position when a nominal pressure less than the predetermined fluid pressure exists within fluid cavity 31D and chamber 255. In some instances, the nominal pressure is, for example, atmospheric pressure. When a fluid pressure greater than the nominal pressure develops in fluid cavity 31D and chamber 255, biasing members 275, 297 will be compressed by piston 260 and will develop a resistive force even before piston end 263 translates sufficiently to first contact the switch 295, i.e. battery 287. In such embodiments, a range of lower fluid pressures may not activate indicators 292 while a higher fluid pressure can provide additional force against biasing members 275, 297, ultimately causing piston 260 to contact and move switch 295 to activate indicators 292.

Referring now to FIGS. 2 and 4, as previously described, wash pipe assembly 10, including a self-contained pressure indicator assembly 200, is disposed between conduit 18 and rotating conduit 20. During drilling operations with system 5, pressurized drilling mud 421 is pumped through conduit 18, assembly 10, and conduit 20. The pressurized drilling mud 421 energizes packing ring 44 in upper gland assembly 14, as well as first packing ring 30A. Initially, when all packing rings 30A, 30B, 30C, 30D are fully intact (i.e., none of packing rings 30A, 30B, 30C, 30D have failed or been compromised), pressurized drilling mud 421 contacts and energizes lowermost packing ring 30A, but does not contact or energize the remaining downstream packing rings 30B, 30C, 30D. As operations continue, packing rings 30A, 30B, 30C sequentially begin to fail, i.e. to leak, allowing pressurized drilling mud 421 to contact and energize the subsequent downstream packing ring 30B, 30C, 30D. Once packing rings 30A, 30B, 30C have failed, pressurized drilling mud 421 fills fluid cavity 31D, contacts and energizes packing ring 30D, and flows through the passage segments 140, 225, 215, 247 to piston 260. Thus, upon failure of packing rings 30A, 30B, 30C, piston 260 is exposed to the fluid pressure of drilling mud 421. The diameter of first portion 262 and end 264, the size and the spring constant of biasing member 275, and the size and the spring constant of the biasing member that biases battery 287 toward shoulder 286 are custom tailored and selected such that battery 287 is electrically coupled to the LEDs when piston 260 is exposed to pressurized drilling mud 421, thereby illuminating the LEDs and providing a visual indication that packing rings 30A, 30B, 30C have failed and maintenance should be performed to replace packing rings 30A, 30B, 30C prior to failure of packing ring 30D. By providing a visual warning upon failure of packing rings 30A, 30B, 30C, and before failure of the last packing ring 30D, assembly 200 enables personnel to schedule maintenance of lower packing gland 12 a convenient time (e.g., at the next schedule downtime).

Figure 11:
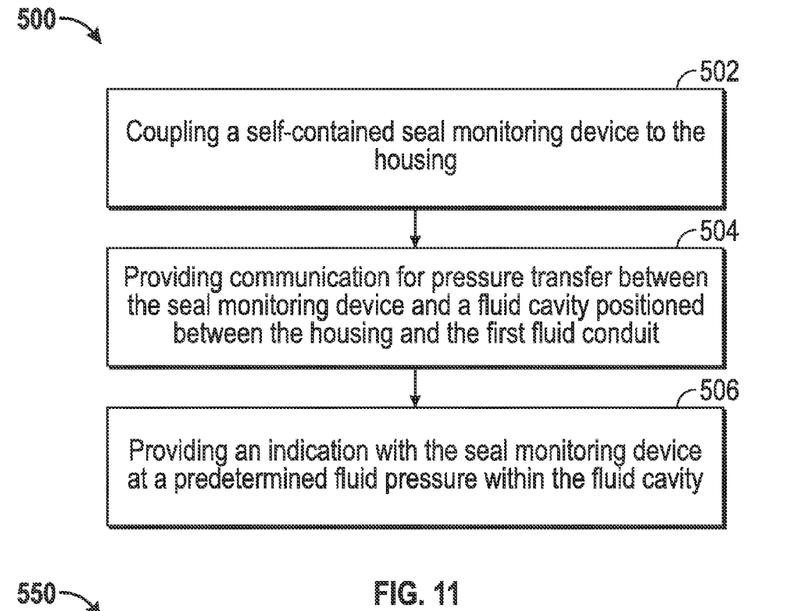
FIG. 11 is a flow diagram illustrating a method in accordance with the principles described herein for identifying the failure of a seal disposed between a first fluid conduit and a housing rotatably disposed about the first fluid conduit.

Referring now to FIG. 11, an embodiment of a method 500 for identifying failure of a seal or seal assembly (e.g., seals 30A, 30B, 30C) disposed between a first fluid conduit (e.g., wash pipe 16) and a housing rotatably disposed about the first fluid conduit (e.g., housing 22) is shown. At block 502, method 500 includes coupling a self-contained seal monitoring device to the housing. Block 504 includes providing communication for pressure transfer between the seal monitoring device and a fluid cavity positioned between the housing and the first fluid conduit. The fluid cavity can be an annular space between the wash pipe and the lower gland housing or a portion of this annular space. In some applications of method 500, the operation of providing communication for pressure transfer will include providing fluid communication for fluid exchange. Block 506 includes providing an indication with the seal monitoring device at a predetermined fluid pressure within the fluid cavity.

Figure 12:
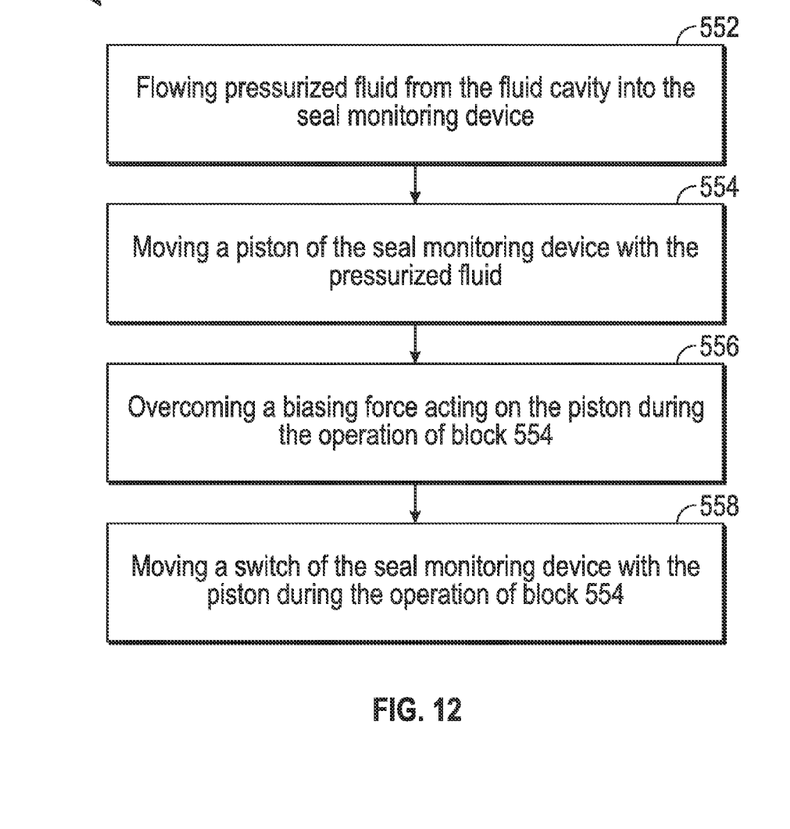
FIG. 12 is a flow diagram illustrating a method in accordance with the principles described herein for identifying the failure of a seal disposed between a first fluid conduit and a housing rotatably disposed about the first fluid conduit.

Referring now to FIG. 12, an embodiment of a method 550 for identifying failure of a seal or seal assembly (e.g., seals 30A, 30B, 30C) disposed between a first fluid conduit (e.g., wash pipe 16) and a housing rotatably disposed about the first fluid conduit (e.g., housing 22), wherein, a cavity is formed between the first fluid conduit and the housing, is shown. At block 552, method 550 includes flowing pressurized fluid from the fluid cavity into the seal monitoring device. Block 554 includes moving a piston of the seal monitoring device with the pressurized fluid. Block 556 includes overcoming a biasing force acting on the piston during the operation of block 554, and block 558 includes moving a switch of the seal monitoring device with the piston during the operation of block 554. Method 550 is capable of being performed as a part of method 500, for example, during the operation of block 506.

In the embodiment of self-contained seal monitoring assembly 200 described herein, indicators 292 of signaling assembly 280 are described as visual indicators. However, in some other embodiments, seal monitoring assembly 200 is configured with another type of indicator 292 to provide other forms of notification such as an electromagnetic signal of another frequency (for example a radio frequency signal), an audible signal (for example from a horn), or any other suitable means of indication. The suitable means of indication or signal may be configured for observation by personnel or may be configured to be sensed by or transmitted to a control system, depending on the particular embodiment. Still further, the signal may be steady, intermittent, or periodic. Some embodiments include a mechanical flag selectively held or released by a switch and energized by a biasing member, such as a spring, for example, and such embodiments may be implemented without a battery. The flag may include a bright color to attract the attention of an equipment operator.

Some embodiments similar to signaling assembly 280 include a stationary battery relative to the body of the signaling assembly and include an electrical switch that is distinct from the battery. The electrical switch includes an electrically open or "off" position and an electrically closed or "on" position. The electrical switch is electrically coupled to the battery and includes an electrical contact electrically coupled to the indicator or indicators 292, for example lights. The electrical switch and battery are configured to power the indicators 292 in the activated state when the electrical switch is in the "on" position. In some of these embodiments, a single biasing member, such as member 275, acts on piston 260.

In the disclosed embodiment, fluid and fluid pressure are freely transmitted between fluid cavity 31D and assembly 200. In other embodiments, a barrier device, such as a diaphragm, is added to inhibit the flow of fluid between fluid cavity 31D and assembly 200 while allowing the transmission of pressure therebetween. In some situations this arrangement is beneficial for isolating assembly 200 from the fluid within wash pipe assembly 10.

Although FIG. 1 illustrates a land-based drilling system 5, embodiments disclosed herein can also be used in conjunction with off-shore well drilling systems. In addition, although self-contained seal monitoring assembly 200 was described in the context of monitoring packing rings 30A, 30B, 30C, 30D in wash pipe assembly 10, embodiments described herein can be used to monitor seals in a variety of other applications including, for example, in manufacturing facilities, vehicles, and any equipment that uses a rotating sealed coupling to contain fluids.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order, and further, some steps may be performed in parallel with each other. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A device for monitoring a seal assembly disposed in an annular space between a first fluid conduit and a housing rotatably disposed about the first fluid conduit, the device comprising:
 a body having a central axis, a first end, a second end opposite the first end, and a through-passage extending axially from the first end to the second end;
 a piston slidably disposed in the through-passage of the body;

a biasing member axially disposed between the body and the piston, wherein the biasing member is configured to bias the piston axially towards the first end of the body; and a signaling assembly coupled to the second end of the body and including an indicator, an electrical switch coupled to the indicator, and a battery electrically coupled to the electrical switch;

wherein the indicator has an activated state and a deactivated state, and wherein the electrical switch has a first position placing the indicator in the deactivated state and a second position placing the indicator in the activated state, wherein the electrical switch and the battery is configured to power the indicator in the activated state when the electrical switch is in the second position;

wherein the piston is configured to translate axially in the through-passage to transition the electrical switch between the first position and the second position and transition the indicator between the deactivated state and the activated state;

wherein the through-passage is exposed to a fluid pressure in the annular space between the first fluid conduit and the housing.

2. The device of claim 1, wherein a chamber extends axially from the first end of body to the piston; and
   wherein the piston is configured to move in the body in response to a force differential developed by the combination of a fluid pressure in the chamber acting on the piston in a first axial direction and a biasing force acting on the piston in a second axial direction, opposite the first axial direction.

3. The device of claim 1, wherein the through-passage of the body includes an internally threaded first passage segment extending axially through the first end, a second passage segment extending axially from the first passage segment, a third passage segment extending axially from second passage segment, and a fourth passage segment extending axially from third passage segment and through the second end;
   wherein the first passage segment has a first diameter, the second passage segment has a second diameter that is less than the first diameter, the third passage segment has a third diameter that is less than the second diameter, and the fourth passage segment has a fourth diameter that is less than the third diameter; and
   wherein the piston is at least partially disposed in the third passage segment and fourth passage segment.

4. The device of claim 1, wherein the piston is biased toward the first position.

5. The device of claim 1, wherein the through-passage is in fluid communication with the annular space between the first fluid conduit and the housing.

6. The device of claim 1, wherein the indicator is an electrical indicator;
   wherein the electrical switch comprises a contact electrically coupled to the electrical indicator;
   wherein when the electrical switch is in the first position, the battery disengages the contact; and
   wherein when the electrical switch is in the second position, the battery engages the contact and transitions the indicator to the activated state.

7. The device of claim 6, wherein the electrical indicator is a light or is configured to provide an audible signal.

8. A device for monitoring a seal assembly disposed in an annular space between a first fluid conduit and a housing rotatably disposed about the first fluid conduit, the device comprising:
   a body having a central axis, a first end, a second end opposite the first end, and a through-passage extending axially from the first end to the second end;
   a piston slidably disposed in the through-passage of the body;
   a biasing member axially disposed between the body and the piston, wherein the biasing member is configured to bias the piston axially towards the first end of the body; and
   a signaling assembly coupled to the second end of the body and including an indicator and a switch coupled to the indicator, wherein the indicator has an activated state and a deactivated state, and wherein the switch has a first position placing the indicator in the deactivated state and a second position placing the indicator in the activated state;
   wherein the piston is configured to translate axially in the through-passage to transition the switch between the first position and the second position and transition the indicator between the deactivated state and the activated state;
   wherein the through-passage is exposed to a fluid pressure in the annular space between the first fluid conduit and the housing;
   wherein the indicator is an electrical indicator;
   wherein the switch is an electrical switch comprising a battery and a contact electrically coupled to the indicator;
   wherein when the electrical switch is in the first position, the battery disengages the contact; and
   wherein when the electrical switch is in the second position, the battery engages the contact and transitions the indicator to the activated state.

9. The device of claim 8, wherein the electrical indicator is a light or is configured to provide an audible signal.

10. The device of claim 8, wherein a chamber extends axially from the first end of body to the piston; and
    wherein the piston is configured to move in the body in response to a force differential developed by the combination of a fluid pressure in the chamber acting on the piston in a first axial direction and a biasing force acting on the piston in a second axial direction, opposite the first axial direction.

11. The device of claim 8, wherein the through-passage of the body includes an internally threaded first passage segment extending axially through the first end, a second passage segment extending axially from the first passage segment, a third passage segment extending axially from second passage segment, and a fourth passage segment extending axially from third passage segment and through the second end;
    wherein the first passage segment has a first diameter, the second passage segment has a second diameter that is less than the first diameter, the third passage segment has a third diameter that is less than the second diameter, and the fourth passage segment has a fourth diameter that is less than the third diameter; and
    wherein the piston is at least partially disposed in the third passage segment and fourth passage segment.

12. The device of claim 8, wherein the piston is biased toward the first position.

13. The device of claim 8, wherein the through-passage is in fluid communication with the annular space between the first fluid conduit and the housing.

14. A drilling system, comprising:
a first conduit;
a rotatable conduit configured to rotate relative the first conduit;
a wash pipe having a central axis, a first end coupled to the first conduit, and a second end coupled to the rotatable conduit with a gland assembly;
wherein the gland assembly includes an annular housing rotatably disposed about the wash pipe, a first packing ring radially positioned between the wash pipe and the housing, a second packing ring radially positioned between the wash pipe and the housing and axially spaced from the first packing ring, and a fluid cavity radially positioned between the wash pipe and the housing and axially positioned between the first packing ring and the second packing ring; and
a self-contained seal monitoring device coupled to the housing and exposed to the fluid pressure in the fluid cavity;
wherein the housing and the seal monitoring device are configured to rotate together relative to the first conduit and the wash pipe;
wherein the seal monitoring device is configured to provide an indication in response to a predetermined fluid pressure in the fluid cavity.

15. The system of claim 14, wherein the seal monitoring device is configured to provide the indication upon failure of the first packing ring.

16. The system of claim 14, wherein the self-contained seal monitoring device comprises:
a body having a central axis, a first end, a second end opposite the first end, and a through-passage extending axially from the first end to the second end, wherein the through-passage is in fluid communication with the fluid cavity in the housing;
a piston slidably disposed in the through-passage of the body;
a biasing member axially disposed between the body and the piston, wherein the biasing member is configured to bias the piston axially towards the first end of the body; and
a signaling assembly coupled to the second end of the body, wherein the signaling assembly includes a battery and an indicator, wherein the battery is configured to selectively power the indicator upon engagement with an electrical contact electrically coupled to the indicator, and wherein the battery is biased axially towards the first end of the body and out of engagement with the electrical contact;
wherein the piston is configured to translate in the through-passage to transition the battery into and out of engagement with the electrical contact.

17. The system of claim 16, wherein the indicator is a light or is configured to provide an audible signal.

18. The system of claim 16, wherein a chamber extends axially from the first end of body to the piston; and
wherein the piston is configured to move in the body in response to a force differential developed by the combination of a fluid pressure in the chamber acting on the piston in a first axial direction and a biasing force acting on the piston in a second axial direction, opposite the first axial direction.

19. The system of claim 14, wherein the gland assembly includes a spacer ring axially positioned between the first packing ring and the second packing ring, and a set-ring threaded into the housing and configured to maintain the first packing ring, the second packing ring, and the spacer ring within the housing.

20. The system of claim 14, wherein the first conduit is stationary.

21. A method for identifying failure of a seal disposed between a first fluid conduit and housing rotatably disposed about the first fluid conduit, the method comprising:
(a) coupling a self-contained seal monitoring device to the housing for rotation with the housing;
(b) providing communication for pressure transfer between the seal monitoring device and a fluid cavity positioned between the housing and the first fluid conduit; and
(c) providing a visual or audible indication produced by the seal monitoring device at a predetermined fluid pressure within the fluid cavity:
wherein (c) comprises:
(c1) flowing pressurized fluid from the fluid cavity into the seal monitoring device;
(c2) moving a piston of the seal monitoring device with the pressurized fluid;
(c3) overcoming a biasing force acting on the piston during (c2);
(c4) moving a switch of the seal monitoring device with the piston during (c2):
wherein (c4) comprises
moving a battery of the seal monitoring device into engagement with an electrical contact.

22. The method of claim 21, wherein (c) comprises emitting a visible signal from the seal monitoring device.

23. The method of claim 21, further comprising:
rotating the housing and the seal monitoring device relative to the first fluid conduit.

* * * * *